(No Model.)
T. HIPWELL.
FENDER AND ANDIRON.
No. 390,020. Patented Sept. 25, 1888.
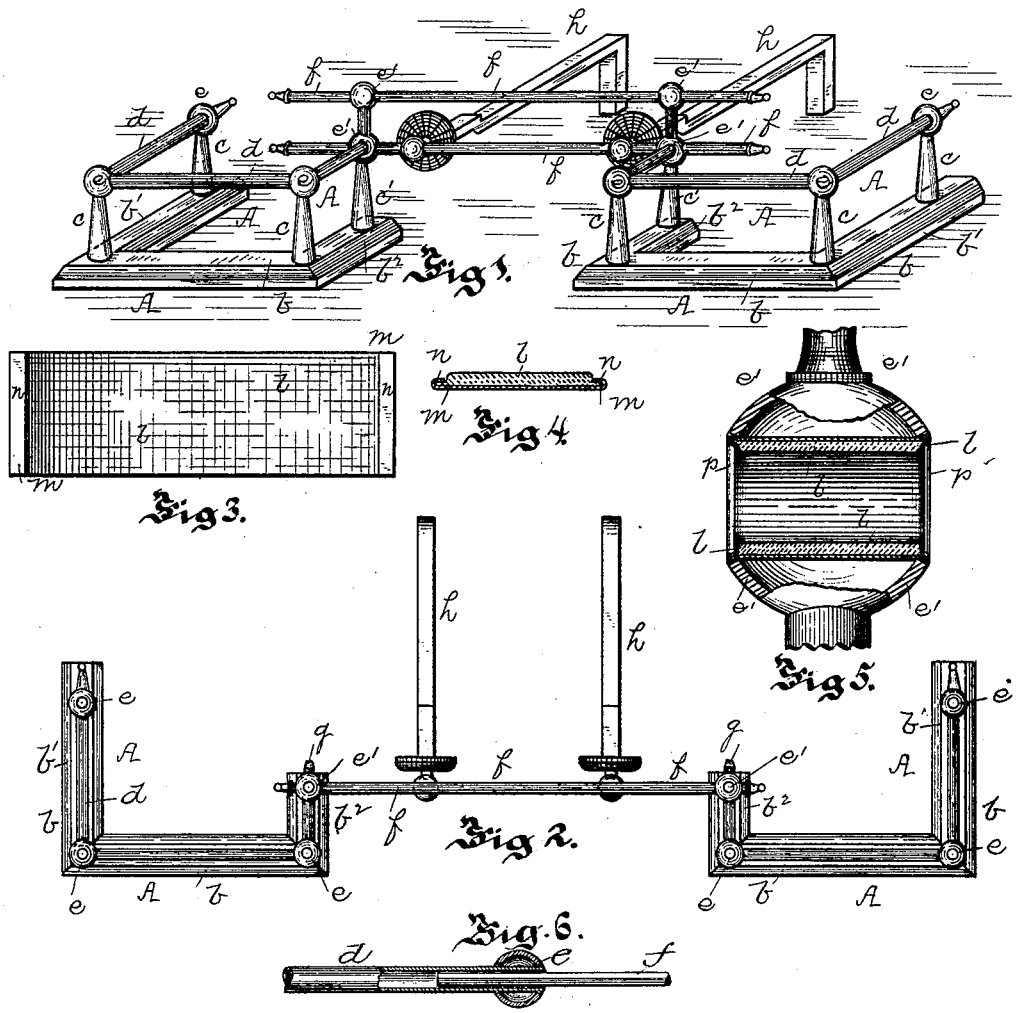
Witnesses:
J. A. Cooke
J. E. Barnes
Inventor.
Thomas Hipwell
By James D. Kay
Attorney

United States Patent Office.

THOMAS HIPWELL, OF ALLEGHENY, ASSIGNOR TO THE PITTSBURGH BRASS COMPANY, (LIMITED,) OF PITTSBURG, PENNSYLVANIA.

FENDER AND ANDIRON.

SPECIFICATION forming part of Letters Patent No. 390,020, dated September 25, 1888.

Application filed September 13, 1887. Serial No. 249,539. (No model.)

*To all whom it may concern:*

Be it known that I, THOMAS HIPWELL, of Allegheny, in the county of Allegheny and State of Pennsylvania, have invented a new and useful Improvement in Fenders and Andirons; and I do hereby declare the following to be a full, clear, and exact description thereof.

My invention relates to fenders and andirons, its principal object being to provide a fender which will fit fire-places or hearths of different sizes, and a further object being to provide the fenders with andirons for supporting grate-baskets and wood or other logs.

It is well known that the ordinary fenders are only formed of one length, and that in order to supply the trade it is necessary for dealers to carry a stock of different lengths of fenders, while the users of the fenders often desire to employ them at different grates in different rooms or houses which the fenders do not fit properly. By my invention these difficulties are entirely overcome.

My invention consists, generally, in forming the fender of two end sections connected by a sliding or other movable part or parts engaging with said end sections.

It also consists in combining with the fender andirons having one end thereof connected to the fender.

It also consists in certain details of construction, as hereinafter specifically set forth.

To enable others skilled in the art to make and use my invention, I will describe the same more fully, referring to the accompanying drawings, in which—

Figure 1 is a perspective view of the preferred form of the invention. Fig. 2 is a plan view of the same. Figs. 3, 4, and 5 are detail views illustrating the manner of securing the felt lining in the slip-sockets, and Fig. 6 is a detail view showing a form of joint which may be employed between the sections and connecting-bars.

Like letters indicate like parts in each.

In the preferred form of my invention (shown in Figs. 1 and 2) the fender has two bodies or sections, A A, which may be of any desired form of ornamentation, these bodies having the base-plates $b$, which rest upon the hearth and support the fender. The base-plates have the end portions, $b'$, extending inwardly toward the grate-front, and a short inner extension, $b^2$. Extending up from the base-plates are the posts $c$, which are connected by bars $d$, the posts having knobs or balls $e$, to which the bars are connected. The posts $c'$ at the inner ends of the extensions $b^2$ are provided with one or more slip-sockets, $e'$, through which the sliding bars $f$ pass, these bars thus connecting the two bodies or sections A A and forming the complete fender. The connecting-bars $f$ are made of such length that they permit the bodies or sections to be drawn apart to form a long fender or to be closed together to form a short fender, the bars $f$ sliding within the sockets $e'$ $e'$, and the fender being thus made longitudinally extensible, so that it may be adjusted to fit any width of grate or hearth.

When the fender is adjusted to the desired length, the bars may be brought to a central position with relation to the bodies or sections, and, if desired, secured by set-screws $g$ in the sockets $e'$. The sliding bars $f$ may be provided with ornamented ends, as shown; or, if desired, they may slide or telescope within the longitudinal bars of the bodies or sections A A, as shown in Fig. 6, the inner extensions, $b^2$, being in this case dispensed with.

As the connecting-bars $f$ are generally highly polished, especially in handsome brass fenders, and as the inner faces of the slip-sockets $e'$ might scratch or mar these rods, I provide the slip-sockets with felt or other soft lining, as at $l$, which will protect the bar from injury. This lining is preferably secured in place in the following manner: I take a small sheet of brass or other suitable metal, $m$, corresponding in length to the circumference of the bore of the socket $e'$ and of slightly greater width than the length of said socket, and on this sheet $m$ is placed the felt lining $l$, of the same length, but slightly narrower than the sheet, as shown in Fig. 4. The side edges of the sheet are then turned over onto the felt, as shown in Fig. 4, forming the laps or seams $n$, and the felt-lined sheet turned into tubular form and slipped into the bore of the socket $e'$. By means of a suitable tool the laps or seams $n$ are then flared out against the beveled faces $p$ of the sockets $e'$, thus securing the felt lining in place in such manner that only the felt lining *l* comes in contact with the surface of the sliding bar.

Connected to the fender are the andirons *h*, which extend inwardly from the fender-body, so as to enter within the fire-place and support the wood or imitation-wood logs, grate-baskets, gas-burners, &c., therein, the fender supporting one end of the andirons, while the other ends rest upon the hearth. Any suitable connection between the andirons and fender may be employed, that shown being sockets on the ends of the andirons slipping over the lower sliding bar, *f*, and the andirons being thus made longitudinally adjustable upon the fender, which is desirable, according to the width of the fire-place. The combined fender and andirons enables the user to draw out the andirons and the grate-basket, burner, or logs supported thereon without danger of burning the hands, while the two articles combined present a handsome appearance. The fender may of course be employed without having the andirons attached to it, and any suitable design of andiron may be used with it.

By my invention I am thus enabled to form a fender adapted to fit any width of grate-front or length of hearth, so that it may be transferred from one fire-place to another, thus overcoming the most serious objection to the ordinary fender. It also does away with the necessity of the dealer carrying a large stock of different-sized fenders, and it can be packed in less space, this being an important point in shipping. At the same time the fender presents a handsome and more ornamental appearance, giving a greater opportunity to the manufacturer to produce different and pleasing designs.

What I claim as my invention, and desire to secure by Letters Patent, is—

1. A fender formed of two end sections and one or more bars connecting said end sections and sliding in seats therein, substantially as set forth.

2. The combination of a fender with andirons having one end connected thereto and supported thereby, substantially as set forth.

3. The combination of the fender having the fender-bar and andirons provided with sockets fitting around said bar, substantially as set forth.

4. In fenders, the combination of the end sections and a bar connecting said sections and sliding in slip-sockets therein, said sockets having felt or other soft linings, substantially as set forth.

In testimony whereof I, the said THOMAS HIPWELL, have hereunto set my hand.

THOMAS HIPWELL.

Witnesses:
J. N. COOKE,
N. S. STOCKWELL.